United States Patent [19]

Saraga et al.

[11] 4,034,344
[45] July 5, 1977

[54] CHARACTER THINNING APPARATUS

[75] Inventors: Peter Saraga, Salfords, England; Pieter Reijnierse, Eindhoven, Netherlands

[73] Assignee: U.S. Philips Corporation, New York, N.Y.

[22] Filed: Nov. 3, 1975

[21] Appl. No.: 628,089

[52] U.S. Cl. ............. 340/146.3 H; 340/146.3 MA
[51] Int. Cl.² ..................................... G06K 9/12
[58] Field of Search ......... 340/146.3 H, 146.3 MA, 340/146.3 AE, 146.3 R

[56] References Cited

UNITED STATES PATENTS

| | | | |
|---|---|---|---|
| 3,196,398 | 7/1965 | Baskin | 340/146.3 H |
| 3,753,229 | 8/1973 | Beun et al. | 340/146.3 MA |
| 3,846,754 | 11/1974 | Oka et al. | 340/146.3 H |
| 3,899,771 | 8/1975 | Saraga et al. | 340/146.3 AE |
| 3,940,737 | 2/1976 | Beun | 340/146.3 MA |

OTHER PUBLICATIONS

Sakai et al., "Extraction of Invariant Picture Sub-structures By Computer," *Computer Graphics J Image Processing*, vol. 1, No. 1, Apr. 1972, pp. 81–96.

*Primary Examiner*—Leo H. Boudreau
*Attorney, Agent, or Firm*—Frank R. Trifari; Daniel R. McGlynn

[57] ABSTRACT

Character thinning apparatus for use in recognizing characters comprising means for applying a compound operator in cycles to each point of the binarized character on a first matrix, and means for rewriting, in each cycle, character points to which the compound operator is applied into corresponding positions in a second matrix in accordance with a compound test criterion.

4 Claims, 49 Drawing Figures

```
8 1 2
7 P 3
6 5 4
```
Fig. 3
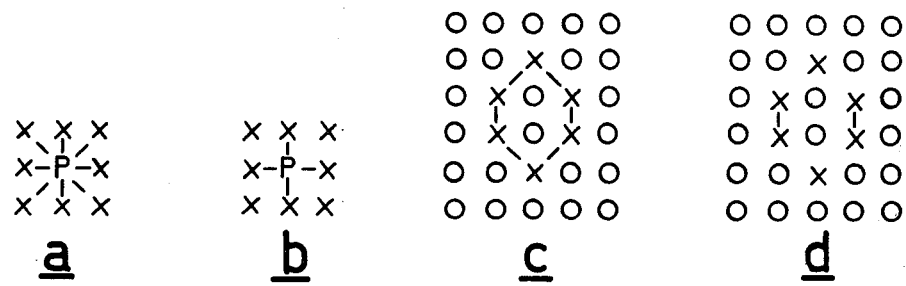
Fig. 4
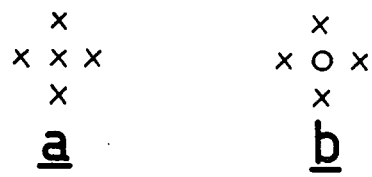
Fig. 6
```
O X X      X X X      O X X      X O X
O P X      O P O      O P X      X P X
O X X      O O O      X O O      X O X
```
Fig. 7

|     | A | B | C | D |
|-----|---|---|---|---|
| 13  | O O O<br>X X O<br>O (X) X | O O X<br>O X (X)<br>O X O | X (X) O<br>O X X<br>O O O | O X O<br>(X) X O<br>X O O |
| 20  | X O O<br>(X) X O<br>O X O | O O O<br>O X X<br>X (X) O | O X O<br>O X (X)<br>O O X | O (X) X<br>X X O<br>O O O |
| 33  | X O O<br>(X) X O<br>O (X) X | O O X<br>O X (X)<br>X (X) O | X (X) O<br>O X (X)<br>O O X | O (X) X<br>(X) X O<br>X O O |

Fig.18

| 13A | 13C | 33C |
|-----|-----|-----|
| O O O<br>X X O<br>O (X) X | X X O<br>O (X) X<br>O O O | X X O<br>O (X) X<br>O O X |

Fig.19

|     | A | B | C | D |
|-----|---|---|---|---|
| 45  | X X O<br>(X) X O<br>X X O | X (X) X<br>X X X<br>O O O | O X X<br>O X (X)<br>O X X | O O O<br>X X X<br>X (X) X |
| 61  | X X O<br>(X) X O<br>X (X) X | X (X) X<br>(X) X X<br>X O O | X (X) X<br>O X (X)<br>O X X | O O X<br>X X (X)<br>X (X) X |
| 62  | X (X) X<br>(X) X O<br>X X O | X (X) X<br>X X (X)<br>O O X | O X X<br>O X (X)<br>X (X) X | X O O<br>(X) X X<br>X (X) X |
| 60  | X (X) X<br>(X) X O<br>X (X) X | X (X) X<br>(X) X (X)<br>X O X | X (X) X<br>O X (X)<br>X (X) X | X O X<br>(X) X (X)<br>X (X) X |

```
         X
 XXX    XXX      X X X
 O P O   O P X   X P X
 O O O    O O     O         Fig. 26

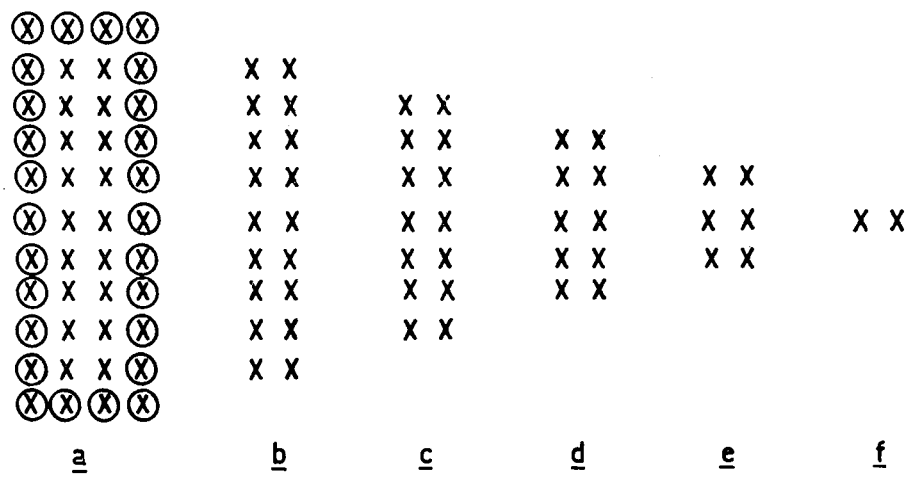
Fig. 28
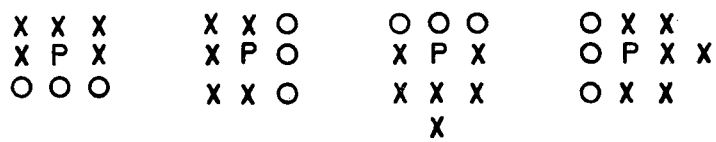
Fig. 29
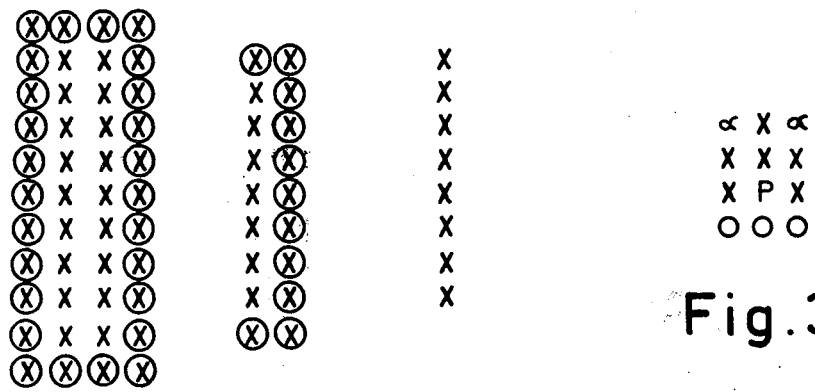
Fig. 30
Fig. 33

Fig. 31

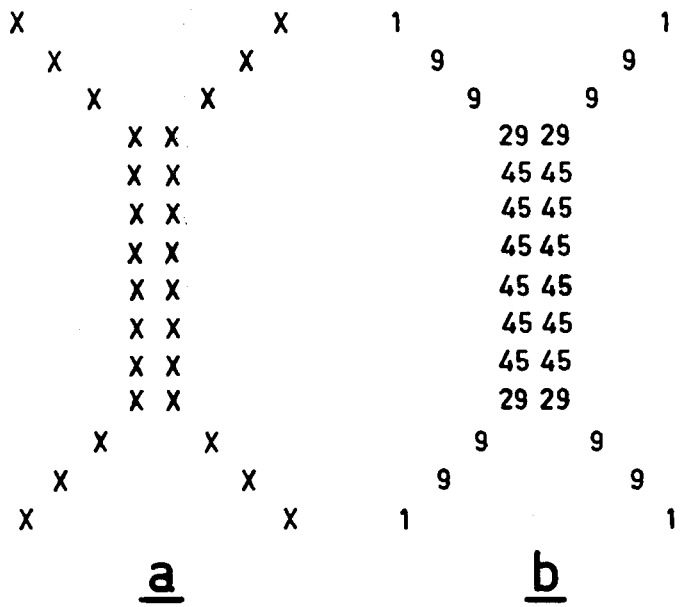
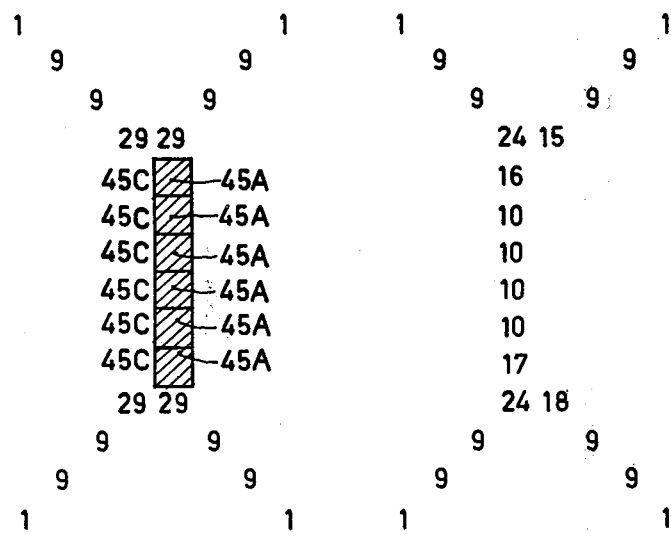
Fig.32

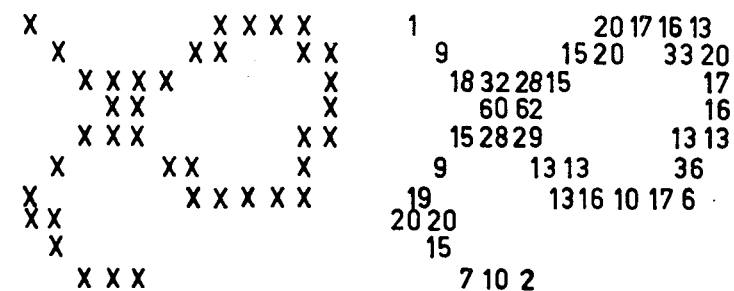
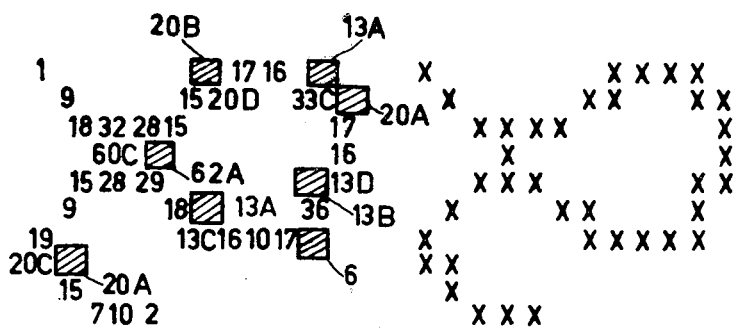
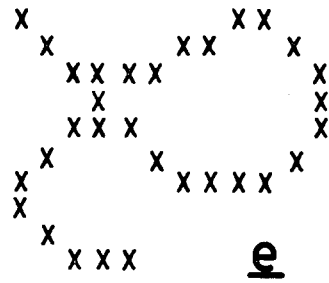
Fig.34

```
B A B
A P A
B A B
```
Fig.37
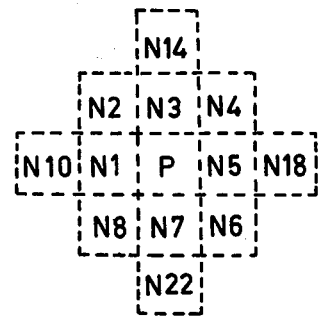
Fig.44
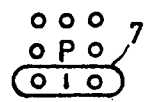
Fig.38
Fig.39
Fig.40
Fig.41
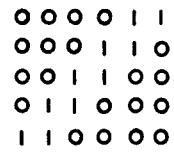
Fig.42
Fig.43

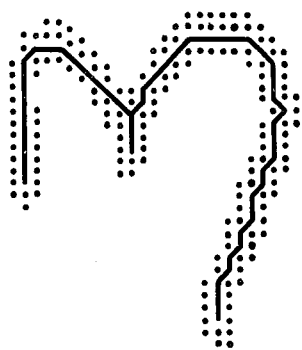
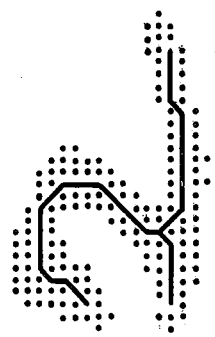
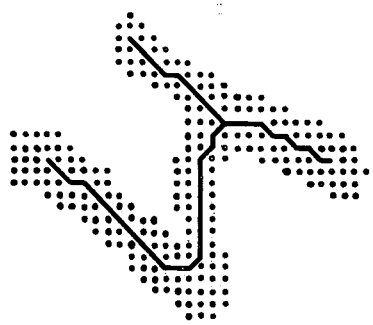
Fig. 45

CHARACTER THINNING APPARATUS

This invention relates to character recognition systems.

Many proposed character recognition processes would operate more efficiently if the characters to be recognized were composed of thin strokes rather than of strokes having finite (and usually variable) width. In fact, a great deal of the essential information about the input character is contained in the locus of the centre line of the character strokes. Thus the production of a preprocessing system for extracting this locus from the character — that is for transforming the character into a "thin-line" version — can constitute an important step towards identifying the character.

It is an object of the present invention, therefore, to provide improved apparatus for forming a thin-line version of a thick character, preferably one having single-element thickness.

Such apparatus can be used as an alternative to "thinning" apparatus described in U.K. patent specification No. 1,153,703 or No. 1,166,542 or No. 1,255,653.

The methods by which a character may be stored or displayed for analysis will not be discussed since they are not relevant to the present invention. Instead it will be assumed that the original character has been scanned, digitized and re-written in a storage matrix as a primary character constituted by a series of picture elements or points representing binary 1 and 0's (or equivalent) corresponding, for example, to "black" and "white" in the normal case of characters printed or drawn in black on a white base. It will also be assumed that these elements are disposed regularly in rows and columns and such a character will be referred to as a "binarised" character.

Operators may be applied to binarised characters to produce thinning.

An operator is herein defined as having an operative centre surrounded by a sub-matrix of points fitting the storage matrix, and which is adapted to apply a binary logic function to the binary values of the character points found in coincidence with the sub-matrix points.

Each operator may have a particular binary logic function which has as its input parameters the values of the points of the binarised character which are found in coincidence with points of the operator sub-matrix when the operative centre is applied to the character point under test. As previously noted, these values can only have the value 1 or 0, that is "black" or "white" respectively. For example, a binary logic function may require that a certain selection of the points of the operator sub-matrix must be in coincidence with character points having the value 1 and the remainder with the value 0 if any change is to be made in the point under test. But in other examples the binary logic function may allow alternative combinations of points that is to say, the logic function may contain OR combinations of the input point values as well as AND combinations. This fact can be expressed alternatively by saying that the operator is a combination of alternative elementary AND operators, any one of which can provide an output instruction to change the point under test if the particular AND combination is satisifed. Herein, the elementary AND operators, which are referred to alternatively as operators, are based on a set of operators which will be described with reference to FIG. 5 of the drawings accompanying the provisional specification.

The rows and columns of matrix points and operator points are at least notionally orthogonal so that there are four orientations in which the operator points can register with the matrix points. Hence, an operator may be applied in four orientations defined herein as the four phases of the operator. All the scans can follow a common raster of parallel lines corresponding to all the rows or all the columns of the matrix. A square operator is defined herein as one having an equal number of points on each of its sides, said number being odd so as to allow one point to act as the operative centre of the operator. It should be noted that any point in the matrix has four orthogonal neighbours and four diagonal neighbours, at least notionally.

In any one application of the compound operator to the character, the operator is applied to each point of the binarised character once and the result is written into a corresponding position in the second matrix to avoid making changes to points in the first binarised character which may be in coincidence with the sub-matrix points later in the same application. Provided each character point is visited once by the operator during the application, the order of visiting the character points is then immaterial. A random order of visiting may be used. Alternatively, in order to save time, additional means may be employed to confine the operator largely to the black character points to avoid the usually larger number of white character or background points. The order of visiting may be determined by a regular scanning motion of the operator which completely explores a predetermined area within which a character may be found. The regular scanning motion may be along the rows or columns or matrix points and includes the case in which the operator is stationary and the character is moved. It also includes cases (as herein described with reference to FIG. 46) wherein the equivalent of a physical scanning motion is performed electrically by "rolling" the binary information of the character e.g. through a shift register having operator logic output connections from appropriate stages of the register.

The use of a compound operator according to the invention can resemble the system described in the aforesaid U.K. patent specification Nos. 1,153,703 and 1,255,653 in that a scanning cycle may be repeated so as to cause progressive erosion. The main difference is that the present operator is compounded of a number of operators which are applied simultaneously to a character point and the test criterion applied by the present compound operator removes a character point if the binary logic function of any one operator is satisfied.

Another difference in the use of the present operator over those described in the aforesaid patent specifications is that the compound operator may be used in a number of versions each version being defined herein as a different compound of operators. A version of the operator may be applied to the original character a predetermined number of times and then another version may be applied another predetermined number of times. Further versions may be applied later in like manner. Alternatively, the different versions may be applied in some alternating order. As mentioned above, each version is compounded of a number of operators, each of which is an elementary AND operator. The difference between versions of the compound operator lies in the different selection of operators.

As mentioned above, the new character points are written into a second matrix in which a thinner form of the character is built up. In the next cycle the operator would then be applied to the second matrix. Alternatively, if the shift register form of matrix is used to perform electrical "rolling" of the character past the operator, only a sufficient number of rows or columns of the register need be used to accommodate the height or width respectively of the first operator to be applied. The operator output is then fed to a second set of rows or columns sufficient in number to accommodate the next operator to be applied. Further sets of rows or columns are provided, one set for each operator applications. In a practical system in which character points are being derived by columnar scanning of a line of characters, several successive operator applications may be needed. In this case the next character from the line may well have begun to enter the first operator shift register columns before the last character has left the final operator columns.

Before describing the embodiments it will be observed that, before applying a thinning process it is often desirable to reduce noise which may be superimposed on a binarized character. For example, in the case of a printed character, the noise may take the form of blots on the paper, roughness of the paper surface, distortions of the character, incomplete printing, and so forth. If noise reduction is not applied first, there is the risk that noise which is separate from the character may be "thinned" down to single-element thickness and then preserved as having equal rank with the final single-element strokes of the character. Similarly, some irregularities of the initial character outline could develop into permanent excrescences of single-element thickness.

Methods of noise reduction are described in U.K. patent specification Nos. 1,106,974 and 1,106,975. The resulting characters can be substantially free from noise but retain more or less their finite original thicknesses, and this is true also of other noise reduction systems.

The thinning processes based on such compound operators may reduce the width of character limbs satisfactorily but may not thin the character to a skeleton of one point thickness. For some character recognition systems such a skeleton may be required. In this event, the foregoing thinning process may be followed by a cleaning operator applied serially. In this connection, a serial application of an operator is defined as one in which character points are removed from the character in the matrix to which the operator is applied at the moment of application of the operator to each character point in turn. Such a cleaning operator may comprise an operator having an appropriate binary logic function applied in each of the orientations in which it fits the character matrix. The binary logic function may be chosen to reduce a character limb of two points thickness to a limb of one point thickness.

The operators disclosed herein may all be defined as parallel operators in that the operators could be applied simultaneously or "in parallel" to all character points. This follows from the fact that the operator is applied to a character point and a decision made regarding the fate of that point when it is re-written into another matrix. The original character is not altered at the time of application of the operator, so that each character point is treated with respect to its original environment of character and background points.

Embodiments will now be described by way of example with reference to the drawings accompanying the provisional specification. The description below is divided into sections and sub-sections as follows:
1. Introduction and Definitions
   1.1 Thinning
   1.2 Connectivity
   1.3 Creating New Holes
   1.4 Edge Points
2. Serial and Parallel Thinning
   2.1 The Problems of each method
   2.2 The Parallel-Serial method
   2.3 The Multiphase method
   2.4 The Extended Operator method
3. The Systematic Examination of Cases
   3.1 The analysis of Edge points into groups
   3.2 The Analysis of Unclear cases
   3.3 The seven non-ambiguous unclear Cases
   3.4 The consequences of allowing Cases 11,25,26,46
   3.5 The remaining seven ambiguous Cases
4. Solutions to the Ambiguity Dilemma
   4.1 The Multiphase solution
   4.2 Comparison with the operator proposed by Deutsch
   4.3 The Extended Operator solution
   4.4 Comparision with the operator described later with reference to FIGS. 36 to 49
   4.5 The treatment of Ends
   4.6 The relationship between the extended operator and the multiphase operator
5. The Asymmetric Extended Operator
   5.1 Derivation of the Operator
   5.2 Comparison with the S-R-H operator The references used in the description are numbered as follows:
1. Beun, M. 'A flexible method of Automatic Reading of Handwritten Numerals'.
   Part II 'The thinning procedure and determination of special points'.
   Phillips Technical Review Vol. 33, pp 130–137, 1973 No. 5
   British patent application No. 51965/71
   British patent application No. 51966/71
2. Saraga P., Woollons, P. J., 'The design of Operators for Pattern Processing'.
   Proceedings of IEE/NPL conference on Pattern Recognition July 1968, pp 106.
3. Hilditch, C. J., 'Linear Skeletons from Square Cupboards'
   Machine Intelligence 4 (Eds. D. Michie, B. Meittzer) pp 403–420
   American Elsevier, N.Y. 1969
4. Deutsch E. S. 'Towards Isotropic Image Reduction' (After October 1970)
   Proc. I.F.I.P. Congress 71, North-Holland, Amsterdam 1972 pp 161–172
5. Stefanelli, R. and Rosenfeld, A. 'Some parallel thinning algorithms for digital pictures'.
   J.A.C.M. Vol. 18 No. 2 April 1971 pp 255–264
6. Rutovitz D. 'Pattern Recognition' Royal Statistical Society 1966 p 504 Part 4.

In the drawings referred to in the description:
FIG. 1 shows a character on a square matrix,
FIG. 2 shows the FIG. 1 character thinned,
FIG. 3 shows the numbering of neighbours,
FIG. 4 shows eight and four fold black connectivity, FIG. 5 shows all possible 3 × 3 environments of edge points, referred to as cases, FIG. 6 shows the creation of new holes (CH), FIG. 7 shows examples of breaking connectivity (BC) and not breaking connectivity, FIG. 8 shows an example of the parallel thinning dilemma, FIG. 9 shows the analysis of unclear cases, FIG. 10 shows the analysis of case 11, FIG. 11 shows the interaction of the unclear cases, FIG. 12 shows how conjugate pairs of unclear cases exist which do not contain a mirror plane, FIG. 13 shows the interaction of the seven non-ambiguous unclear cases, FIG. 14 shows how the decisions between cases 11 and 22 is made, FIG. 15 shows the second group of non-ambiguous unclear cases, FIG. 16 shows the interactions of cases 11,25,26, and 46 with the set of unclear cases, FIG. 17 shows the interactions of the 7 remaining ambiguous cases, FIG. 18 shows the four phases of cases 13, 20 and 33, FIG. 19 shows how case 13A precludes cases 13C and 33C, FIG. 20 shows the four phases of cases 45,60, 61 and 62, FIG. 21 shows how extended operators for cases 13 and 20 are produced, FIG. 22 shows how an extended operator for case 33E is produced, FIG. 23 shows how an extended operator for case 45E is produced, FIG. 24 shows how extended operators for cases 60E, 61E, and 62E are produced, FIG. 25 shows a summary of all the cases in a compound extended operator, FIG. 26 shows a summary of a compound extended operator described in more detail with reference to FIGS. 36 to 49, FIG. 27 shows a comparison of the speeds of the Multiphase and extended operators, FIG. 28 shows incomplete thinning with a symmetrical extended operator, FIG. 29 shows the introduction of asymmetry into cases 45 and 45E, FIG. 30 shows the effect of the asymmetric extended operator, FIG. 31 shows a comparison of the effect of the symmetric and asymmetric extended operators, FIG. 32 shows another comparison of the effect of the symmetric and asymmetric extended operators, FIG. 33 shows the B phase of case 45H, FIG. 34 shows a comparison of the effect of the asymmetric extended operator and the S-R-H operator, FIG. 35 shows a comparison of the area of operation of the new extended asymmetric operator, the S-R-H operator and the new extended operator, FIGS. 36 to 49 show more detailed embodiments of the operator summarised in FIG. 26.

SUMMARY

Thinning operators can be divided into two types, sequential (or serial) and parallel. Sequential thinning operators may not be useful for character recognition as they erode from one edge and the final skeleton is not the centre line of the character.

There is a fundamental problem however with parallel thinning operators which is exemplified by the case of a double column of black points. A parallel symmetric operator will either remove both edges together and hence remove the whole stroke, or if removal of this type of edge is forbidden, then no practical thinning occurs. If the operator is made asymmetric then the final line is not the stroke centre line since erosion will occur preferentially from one edge.

Three solutions to this problem are known. The first is the Beun (1) technique of a parallel marking of edge points followed by a sequential stripping of marked points. In a sense this is not a parallel system but a hybrid parallel/serial system.

The second solution of the parallel thinning problem is what may be called the multiphase solution. A multiphase thinning system erodes the character stroke from one direction (say top and right) on the odd numbered passes and then from the opposite direction (bottom and left) on even numbered passes. This technique overcomes the problem of the asymmetric parallel operator and the final skeleton is the centre line of the stroke.

The third solution used for example by Hilditch (3) overcomes the double column problem by extending the size of the operator. While this method has the disadvantage compared to the multiphase technique that it does not produce a completely thinned skeleton, it requires fewer passes of the operator. Following the application of the extended operator a final skeleton can be obtained by a single pass of a sequential 'cleaning' operator. Since the thinned character is only 'two thick' erosion from one edge is acceptable.

The operators of the present invention solve this problem and are based on a systematic examination of the possible 3 × 3 environments of every black point. The same analysis is also used to derive both multiphase and extended operators.

The systematic analysis method is used to derive a general symmetric extended operator. An example is given of an operator described with reference to FIG. 26 which is a subset of this general symmetric extended operator.

One of the advantages of the systematic examination of 3 × 3 environments is that the close relationship between the multiphase and extended solutions and their relative merits can be demonstrated. It is shown why both solutions have undesirable features.

The systematic analysis is used to derive a compound operator which overcomes the main limitation of the general symmetric extended operator. This new operator is produced by introducing a small amount of asymmetry into the extended operator. It is demonstrated that this operator has advantages when compared with a system having similar features proposed by Stefanelli and Rosenfeld (5).

Previous workers in this field have tended to define operators in terms of a set of rules. This was certainly elegant, and simplified the implementation of the operators in computer programmes and electronic circuits. Currently however, the best way of electronically implementing operators is by using a 'look-up table' in a read-only-memory. The method of systematic examination expresses operators as a series of 'cases' and is thus well matched to the 'look-up table' implementation. These cases have been referred to hereinbefore as elementary 'AND' operators or simply as operators.

1. Introduction and Definitions

The first stage in a recognition system for hand printed characters, for example, is to scan the character, for example, is to scan the character. The video signal is then sampled and thresholded to produce a binarized character, as herein defined, on a squared matrix as shown in FIG. 1.

Having obtained a binarized character the next stage is to process this to produce a line figure. (As shown in FIG. 2). This is necessary for certain measurements to be made on the character and for the extraction of topological information, both of which may later be used in the recognition process. The overall process of reducing a character such as that in FIG. 1 to a line figure such as that in FIG. 2 is called skeletonisation. The ideal skeleton should approximate to the centre line of the original strokes. The skeletonisation process consists of a number of thinning processes (or passes) each of which erodes part of the edge of the character.

1.1 Thinning

Thinning has been defined as the process which removes all edge points in the character whose removal does not break connectively and which does not create new holes. This definition needs some explanation and in particular the meaning of the terms "edge points" 'connectivity' and 'holes' can be clarified.

1.2 Connectivity

The characters such as those shown in FIGS. 1 and 2 lie on a square matrix each element or point of which is either black or white. Each point in the square matrix has two types of neighbours, direct (or orthogonal) and indirect (or diagonal). This is illustrated by FIG. 3 in which the indirect neighbours of P are 2, 4, 6, 8, and the direct neighbours are 1, 3, 5, 7.

Two black points in the matrix are defined as being connected if it is possible to join one point to the other by 'links'. A link is a straight line joining a black point to a neighbouring black point. There are two possible systems of links. If links can be made between a black point and any of its neighbours (both direct and indirect) which are black (FIG. 4a) then the matrix is defined as having eight-fold-black-connectivity. If on the other hand links are restricted to being between black direct neighbours (FIG. 4b) then the matrix is said to have four-fold-black-connectivity.

Similar rules can be established for white points in the matrix. It is topologically unreasonable for black links to cross white links. Therefore if there is eight-fold-black-connectivity then this implies that the matrix has four-fold-white-connectivity, (and vice-versa). In FIG. 4c there is 8-fold-black-connectivity and the matrix contains one connected black area and two isolated white areas. In FIG. 4d which contains the same disposition of black and white points but in which there is four-fold-black-connectivity there is one connected white area and four isolated black areas. In all that follows 'eight-fold-black-connectivity' (FIG. 4c) is assumed.

1.3. Creating New Holes

The creation of a new hole can be defined as the creation of a white area unconnected to any existing white area. Given eight-fold-black-connectivity a white point will be unconnected to other white areas if all its four direct neighbours are black. Thus during thinning, a black point must not be removed if four direct neighbours are black, i.e. FIG. 6a must not be converted to FIG. 6b.

1.4 Edge Points

An edge point can be defined as a black point having at least one white neighbour. All possible 3 × 3 environments corresponding to edge points are shown in FIG. 5. Each diagram in the figure represents up to four environments, the others being 90°, 180° and 270° rotations of that shown. Each rotation is defined as a 'phase' of the particular 3 × 3 environment or 'case'. It should be noted that the particular phase shown in FIG. 5 is arbitrary.

Edge points are alternatively often defined as black points having at least one direct white neighbour. In this case black points having four direct black neighbours (whose removal would create holes) are excluded from the class of edge points. Points with four direct black neighbors are marked CH in FIG. 5. If this definition of edge points is used then thinning can be defined as the process of removing edge points whose removal does not break connectivity. The group of cases marked CH in FIG. 5 are excluded from those cases in which the removal of the centre point is allowed.

2. Serial and Parallel Thinning

2.1 The Problems of each Method

In a serial thinning process the result of applying the thinning operator to a point in the picture matrix is written back into the same matrix before the operator is applied to the next point. In a parallel process, the thinning operator is applied to each matrix point in parallel, the resulting being written into another matrix.

In a serial process the decision as to whether the removal of a point would break connectivity is simple. If two previously connected black points within 3 × 3 area would no longer be connected following the removal of the centre point, then the removal of this point would break connectively. Some examples are shown in FIG. 7 wherein removal of P in the first two cases would not break connectivity but would in the second two cases.

All possible 3 × 3 patterns where the removal of the centre point whould break connectivity are marked (BC) in FIG. 5. Thus a serial operator could be allowed to remove all centre points in FIG. 5 except those marked CH and BC. Serial thinning operators are not very useful in character recognition applications however, as they tend to erode from one edge leaving a final skeleton which is not the centre line of the original stroke.

In a parallel process the connectivity decision is not so simple because although the removal of one point might not break connectivity the removal of more than one in parallel might do so. The classic example of this is shown in FIG. 8a. The removal of either point A or point B would not individually break connectivity. The removal of both points would however clearly do so. As connectivity must not be broken it would appear that either only one must be removed or neither must be removed.

The consequence of removing neither point is that effective thinning will not take place. A black area such as that shown in FIG. 8b will not be thinned properly because most of the edge points have the same 3 × 3 environment as A or B in FIG. 8a.

If A and B are treated differently the thinning operator becomes asymmetric. If A were removed but not B then the figure shown above would be eroded from the left. This would leave the right hand edge as the single line figure. For most practical applications it is preferred that the final single line should approximate to the centre line of the original black area. Hence an operator asymmetric in this sense is undesirable.

Thus there is a dilemma. It appears that neither alternative gives satisfactory results. There are however at least three ways of overcoming the dilemma. These will be called the 'Parallel/Serial Method', the 'Multiphase Method' and the 'Extended Operator Method'. A number of different combinations of these methods have been used in attempts to find good thinning systems, (1-s).

2.2 The Parallel Serial Method

An example of this technique is the method described by Beun (1). In this system the edge points are marked in parallel during a first pass. The marked points are then 'stripped' sequentially checking before the removal of each point that it will not break the connectivity of the partially stripped character. This technique removes the objection to the serial operator, namely eroding from one edge.

2.3 The Multiphase Method

The multiphase method takes advantage of the fact that thinning is a multipass process i.e., a number of applications of the operator are required before thinning is complete. If on alternate passes the operator erodes the left hand side of a black area on the other passes it erodes the right hand edge then the overall effect of the operator will approximate to a symmetric process. This technique was used by Saraga and Woollons (2). (This was a very simple operator which did not preserve connectivity), and by Deutsch (4) and Stephanelli and Rosenfeld (5). The latter also describe a simplified version of a technique proposed by Hilditch which contains an asymmetric element. The relationship of this technique to the new extended asymmetric operator will be discussed in Section (5.2).

2.4 The Extended Operator Method

The extended operator method involves looking outside the 3 × 3 area whenever a dilemma situation occurs. The extra information obtained is used to determine whether a point may or may not be removed.

This technique has been used by Hilditch (3) and, in conjunction with an asymmetric element, by Stephanelli and Rosenfeld (5).

3. The Systematic Examination of Gases

3.1 The Analysis of Edge Points into Groups

There are 256 possible 3 × 3 patterns in which the centre point is black. As mentioned previously, each of the 3 × 3 patterns in FIG. 5 represents one 'case' each of which has four 'phases' i.e. the pattern shown in FIG. 5 and its rotation through 90°, 180° and 270°. In those cases which possess four-fold symmetry, the four phases are identical. It should also be noted that two of the possible cases i.e., those with all black neighbours and all white neighbours have not been shown in FIG. 5. Apart from these two there are 68 cases shown in FIG. 5. For the purposes of this note, it is convenient to divide them into seven 'groups'.

1. The special case when the surrounding eight points are all black (not shown in FIG. 5).
2. The special case when the surrounding eight points are all white (not shown in FIG. 5).
3. Those cases where there is one black neighbour. These cases are considered separately as they represent the end of a line in the thinned figure. These cases are labelled E in FIG. 5.
4. Those cases where the removal of the centre point would create a hole. These are labelled CH in FIG. 5.
5. Those cases where the removal of the centre point would always break connectivity. These are marked BC in FIG. 5.
6. Those cases where the removal of the centre point would definitely not break connectivity or create holes. These cases are marked R in FIG. 5.
7. The remaining cases which are all edge points but where it is unclear whether a parallel operator would break connectivity. These cases are marked U in FIG. 5.

Group 1 (eight black neighbours) and Group 4 (CH) have been excluded from the class of edge points. Group 2 (eight white neighbours) contains only isolated black points which in character recognition applications should always be removed. Group 3 (E in FIG. 5) which contains end points can be treated in a number of ways and will be considered separately in section (4.5). Their treatment does not affect the design of the rest of the operator. The operator must remove the centre in cases belonging to Group 5 (BC). It is clear that any parallel operator can remove the centre point in all four cases belonging to Group 6 (R in FIG. 5). This leaves the 23 cases belonging to Group 7 (U in FIG. 5), the unclear cases. The way in which these unclear cases are treated determines the structure of the operator.

3.2 The Analysis of Unclear Gases

As mentioned above, there are 23 unclear cases in FIG. 5. Their common factor is illustrated in FIG. 9A which shows only one of the four phases of the typical unclear case. Whenever P has a black direct neighbour R and at least one of A and B and one of C and D are black, the removal of both P and R would break connectivity. It should be noted that no alternative path through S could exist because such an alternative path would only be possible if B and D were present. In that case all four direct neighbours would be black and P itself would not be removed. The 23 unclear cases which have this common factor are listed below.

11, 13, 20, 22, 25, 26, 28, 32, 33, 39, 42, 45, 46, 48, 49, 52, 53, 57, 60, 61, 62, 65, 66.

In order to know whether P can be removed, it must first be ascertained whether R will be removed. In order to determine the removability of R, its own 3 × 3 environment must be investigated. This is illustrated in FIG. 9b. If the removal of P is to be allowed, then removal of R in all possible 3 × 3 environments of R must be forbidden. Case 11 from FIG. 5 will be used as an example to illustrate this point. FIG. 10a shows one phase of case 11 and the position of R. The general environment of R is shown in FIG. 10b. There are in fact eight possible environments for R. They are shown in FIG. 10c together with their case numbers. Four of these eight belong to three cases 38, 55 and 63 which are in the CH group. If R were in any of these environments it would not be removed. The other four possible environments of R are cases 23, 39, 42, 57 which belong to the unclear group. These four cases would have to be forbidden if 11 were to be allowed. It is possible to determine in a similar way those cases that would have to be forbidden for any of the 23 unclear cases to be allowed. The result of this analysis is shown in the chart of FIG. 11.

The first row of FIG. 11 shows that if removal in case 11 is allowed, then it must be forbidden in cases 22, 39, 42 and 57. Of special interest are those 16 cases such as case 13 in which one of the forbidden cases is the same as that being allowed. These 16 cases are labelled A (for 'Ambiguous'). Case 13 is Ambiguous because the unclear direct neighbour of P could possibly be in environment 13 itself, although in a different phase to that of P. These Ambiguous cases form a very important group. In a symmetric operator removal would have to be forbidden in ambiguous cases for connectivity to be preserved. As an illustration of this point, reconsider the example given in FIG. 8a. In this figure, A and B are each others relevant direct neighbour and the 3 × 3 environment of each is a different phase of case 45. If removal in all phases of case 45 were allowed connectivity would be broken. A more detailed analysis of the ambiguous cases will be made in (3.5) and subsequent sections.

As one would expect the chart of FIG. 11 is symmetric about the diagonal. It should also be noted that a number of the cases can be grouped in pairs. Those cases that do not contain a 'mirror plane' must exist in conjugate pairs. FIG. 12 illustrates that case 11 contains a mirror plane and therefore has no pair while cases 13 and 20 having no plane form a pair. The conjugate pairs are indicated at the top of the chart in FIG. 11, by semi-circular links.

In the next two sections the seven non-ambiguous unclear cases will be considered in detail.

3.3 The Seven Non-Ambiguous Unclear Cases

The inter-relationship of these seven cases has been abstracted from the chart in FIG. 11 and is shown in FIG. 13. It can be seen that these seven divide further into two groups which do not interact:

Group A 11, 22
Group B 25, 26, 28, 32, 46

Considering group A first; either 11 can be allowed and 22 precluded or vice-versa. The decision between them is fairly clear when the two cases are examined (see FIG. 14). Since a smooth skeleton is desirable, it is more sensible to allow the removal of P in case 11 (FIG. 14e) rather than case 22 (FIG. 14d).

Similarly considering the group B, either the conjugate pair 28, 32 can be allowed and 25, 26 and 46 excluded or vice-versa. This group of cases is listed in FIG. 15. Using the same criterion as before that simple smooth skeletons are preferred, it is reasonable to remove P in 25, 26 and 46 rather than 28, 32.

3.4 The Consequences of allow cases 11, 25, 26, 46

Allowing removal of these four cases not only precludes 22, 28 and 32, but also a number of the ambiguous cases. Abstracting from the main chart of FIG. 11 the interactions of these four cases, one obtains FIG. 16, in which a cross indicates an excluded case and a tick on allowed case. Analysis of FIG. 16 shows that only seven ambiguous cases remain to be considered. These seven cases are:

13, 20, 33, 45, 40, 61, 62

3.5 The Remaining Seven Ambiguous Cases

The abstracted inter-relationships of seven remaining ambiguous cases are shown in FIG. 17. These cases represent the core of the parallel thinning dilemma. In the following sections both the multiphase and extended operator treatments will be applied to their analysis. It will be shown that if a multiphase approach is followed then the resulting operator is very similar to the multiphase interpretation of the operator proposed by Deutsch. (4) By applying the extended operator treatment a symmetrical extended operator is derived which is described later with reference to FIGS. 25 and 26.

4. Solutions to the Ambiguity Dilemma

4.1 The Multiphase Solution

In the previous section it was demonstrated that seven ambiguous cases remain to be dealt with. It case be seen from the chart of their abstracted inter-relationships, FIG. 17, that these cases fall into two non-interacting groups. These two groups which can be dealt with separately are 13, 20, 33 and 45, 60, 61, 62. It will be demonstrated that if the four phases of each case are considered separately, then it is possible to allow half the phases and exclude the other half.

In FIG. 18 all four phases of cases 13, 20 and 33 are shown. Unclear direct neighbours are shown enclosed by a dotted circle in FIGS. 18, 19 and 20. It can be seen from FIG. 19 that case 13A preclude both 13C and 33C which are possible environments of the unclear direct neighbour of 13A. Similarly 13B precludes 13D and 33D. Applying this analysis to all three cases, it emerges that if the A and B phases of each case are allowed, then the C and D phases must be excluded. Exactly the same is true of the second group 45, 60, 61 62 whose phases are shown in full in FIG. 20.

Although in the above discussion, the allowed phases were A and B and the excluded ones C and D the opposite choice would be equally possible. In fact as mentioned in section 2.3 the multiphase solution involves switching the allowed phases on alternate passes of the operator. It should be noted that another pairing of phases could also have been chosen, i.e. A and D could have been allowed and B and C excluded, (and vice versa).

4.2 Comparison with the Operator Proposed by Deutsch

As a result of the analysis of previous sections a two-phase thinning operator has been developed. The cases in which removal is allowed are:

1. The four cases marked R in FIG. 5 in which removal is always allowed: 3, 4, 6, 12
2. The four cases extracted from the unclear cases: 11, 25, 26, 46
3. On alternating passes half the rotations of cases 13, 20, 33, 45, 60, 61, 62 are allowed.

Deutsch (4) has proposed an asymmetric parallel thinning operator which is mentioned in section 2.1 produces a skeleton which lies along one edge of the original stroke. It is however possible to interpret his operator as a two phase one in which the allowed phases are switched on alternate passes. In this interpretation of Deutsch's operator it would produce a centre line skeleton. It is interesting that although Deutsch used a different approach in the design of his operator, the result is very similar (Deutsch does not remove in case 6) to that derived above by the systematic examination of cases.

4.3 The Extended Operator Solution

As before there are two groups of ambiguous cases to be considered, 13, 20, 33 and 45, 60, 61, 62.

In this approach the ambiguous cases are resolved by extending the size of the operator beyond 3 × 3 points. It is important to note that in this section a symmetric operator is being designed, and all statements apply to all four phases of each case.

As mentioned previously there are two groups of ambiguous cases to be considered. They are 13, 20, 33 and 45, 60, 61, 62. The extended operator approach can best be illustrated by example:

Consider if removal were allowed in case 13 only when point E in the FIG. 21 were black. This would reduce the list of excluded cases from 13, 33, 39, 49, 57, 66 (see chart, FIG. 11) to 39, 49, 57, all of which have been already excluded in the previous analysis (see section 3.4). It would therefore be perfectly acceptable to remove the centre point in FIG. 21b in addition to all previously allowed cases. The addition of this case, which may be called 13E, to the set of allowed cases does not exclude any previously allowed cases or any of the other six ambiguous cases being considered.

Similarly case 20E (FIG. 21c and d) would exclude only cases 42, 52, 57 and 65 which have already been excluded previously. This compares with case 20 which excludes cases 20, 33, 42, 52, 57 and 65. The same method of analysis can be applied to case 33 although in this case there are two direct neighbours R1 and R2 to be considered. E1 in FIG. 22a has the same environment as E in FIG. 21a and E2 in FIG. 22a has the same environment as E in FIG. 21c. Thus the operator shown in FIG. 22b would exclude those cases excluded by 13E and 20E and would therefore be perfectly compatible with all previously allowed cases.

As a result of the foregoing analysis three new cases, in which the centre point may be removed, have been introduced. They ae 13E, 20E and 33E.

A similar analysis can be applied to the group 45, 60, 61, 62. If E is black in FIG. 23a, then the list of cases excluded by case 45 reduces from 45, 59, 60, 61, 62, 63 to 59 and 63. Since these cases have already been excluded 45E, FIG. 23b, is an allowable case.

Cases 60, 61 and 62 are essentially similar except that 61 and 62 have two relevant direct neighbours and case 60 has 3. It can be seen in FIG. 24a, b, c, that D2 and D3 are always in the same environment as the relevant direct neighbours in cases 26 and 25 respectively. Since cases 25 and 26 are allowed these neighbours will not be removed and no limitations to their environments are required. D1 is in the same environment as the direct neighbour in case 45. Thus the operators 60E, 61E, 62E shown in FIG. 24 are allowable.

As a result of the above analysis a new symmetric extended operator has been derived. It will be referred to as S.E.O.I. It can be defined in terms of the cases in which the centre point may be removed.

They are:
1. The four cases marked R in FIG. 5 in which removal is always allowed: 3, 4, 6, 12.
2. The four cases extracted from the seven non ambiguous unclear cases: 11, 25, 26, 46.
3. The seven extended cases: 13E, 20E, 33E, 45E, 60E, 61E, 62E.

These 15 cases are summarised in FIG. 25, in which the pair of linked X's imply an OR function, that is, at least one X must be black.

4.4 An operator based on a sub-set of the cases proposed in Section 4.3.

The operator which is summarised in FIG. 26 and described in detail with reference to FIGS. 36 to 49 can be regarded as being composed of a subset of the cases used in the symmetric extended operator described in the previous section. This operator, which will be referred to as S.E.O.2, allows the centre point to be removed in the following eight cases.

3, 4, 11, 12, 25, 26, 45E, 46, 60E, 61E and 62E.

Other sub-sets are possible. These symmetric extended operators S.E.O. are preferred to Multiphase operators such as those proposed by Deutsch (4) and Sarage and Woolons (2) since they thin in fewer cycles. This is shown in FIG. 27 where, in the first row, two cycles of the S.E.O. are required, but in the second row four cycles of the Multiphase operator are required.

4.5 The treatment of Ends

In all the foregoing analysis the treatment of ends (cases one and two FIG. 5) has beel deliberately ignored. This is because there are various methods of treating ends any of which can be superimposed on any of the thinning systems that have been discussed.

In practice, the method by which ends are dealt with can be very important. In OCR for example it is important that spurious limbs or 'tails' are removed, but it is equally important that ends of genuine strokes should not be eroded.

One example of a solution to this problem is that included in S.E.O.2. In this system it is assumed that any character not completely thinned after five passes is 'too thick' and is liable to be rejected. In these five passes ends are removed, (i.e. cases 1 and 2 are allowed) in the first three passes and are not removed for the final two passes.

Since the method by which ends are treated does not affect the main body of the operator this topic will not be considered further.

4.6 Relationship between the Extended Operator and the Multiphase Operator

The extended operator and the multiphase operator may be compared as may be Deutsch's and S.E.O.2. The Multiphase operator allows removal in the following cases (of section (4.2)).

3, 4, 6, 11, 12, 25, 26, 46 (all phases)
13, 20, 33, 45, 60, 61, 62 (half the phases)

The 'E' (extended) cases allowed in the extended operator correspond exactly to those cases for which the Multiphase operator allows removal in half the phases.

It is interesting to compare the performance of these two thinning sysems both of which allow essentially the same cases, (note Deutsch and S.E.O.2 do not allow removal in case 6). One disadvantage of the Multiphase operator is that it takes more passes before complete thinning is achieved. On the other hand, the extended operator such as S.E.O.2 does not always thin to a line figure and requires a subsequent single pass of a cleaning operator to produce the final skeleton. These features are illustrated in FIGS. 27 and 28. It can be seen from FIG. 28 that the inability of the extended operator to thin the double column can result in the ends of the stroke being eaten away entirely in 5 cycles as at (f). In FIGS. 27 and 28 a circled X is a black point which will be removed in the next cycle.

5. The Asymmetric Extended Operator

5.1 Derivation of the Operator

The limitation of the extended operator such as S.E.O.2 mentioned in section 4.6 above may be overcome by introducing a small amount of asymmetry into the operators.

As an example of what is proposed consider the situation, if, in all cycles, case 45 were allowed in two of its phases and case 45E in the other two, see FIG. 29. The effect of this modification on the thinning performance of the extended operator is shown in FIG. 30, only two cycles being required to thin completely.

The above analysis shows that allowing half the phases of cases 45, 60, 61, 62 excludes only the other half, but does not exclude the extended versions of the other cases. Thus the symmetric extended operator employed an over-strict exclusion rule. This is also true for the other group of ambiguous cases 13, 20 and 33.

Thus a new compound operator is proposed, which will be referred to as the asymmetric extended operator, A.E.O. in which the allowed cases are:

All phases of 3, 4, 6, 11, 12, 25, 26, 46
AB phases of 13, 20, 33, 45, 60, 61, 62
CD phases of 13E, 20E, 33E, 45E, 60E, 61E, 62E The advantages of this operator over the extended operator are illustrated in FIGS. 31 and 32. FIGS. 31a and 32a show a possible final result of thinning with the extended operator. The states corresponding to each point in the black area are shown in FIGS. 31b and 32b. In FIGS. 31c and 32c the full states are shown including where relevant, the phase. The A and B phases of these cases are shaded as they can be removed by the asymmetric operator. The result of applying the asymmetric operator is shown in FIGS. 31d and 32d. It can be seen that with the asymmetric operator no subsequent cleaning pass is required. The use of the asymmetric operator could therefore result in a small reduction in hardware.

5.2 Comparison with the S-R-H Operator

The Stephanelli-Rosenfeld simplified version (5) of an operator proposed by Hilditch (3) has some similarities with the A.E.O. In this operator removal is allowed in the following cases:

All phases of 3, 4, 11, 12, 25, 26, 46
A and D phases of 45, 61, 62
B and C phases of 45H, 61H, 62H where 'H' cases are subsets of the extended cases used in the extended operator. FIG. 33 illustrates this for the B phase of case 45H in which the $a$'s are both black or both white.

This operator has two disadvantages as compared with the A.E.O. Firstly it does not thin as completely as the asymmetric operator. FIG. 34a shows a possible final result of the extended operator. The cases of each black point are shown in FIG. 34b. The full cases (including phase where relevant) are shown in FIG. 34c. The S-R-H operator would remove only the one point in case 62A producing FIG. 34d. The asymmetric operator would remove all the shaded points in FIG. 34c producing FIG. 34e.

The second advantage of the asymmetric operator is that it involves 'looking' at only eleven points surrounding the operating point. This compares with the fourteen required for S-R-H operator and twelve points required for the extended operator. The shapes of the areas of operation for the three operators are illustrated in FIG. 35, in which (a) shows the A.E.O, (b) shows the S-R-H operator and (c) shows the S.E.O. Embodiments of the symmetric extended operator summarised in FIG. 26 will now be described by way of example with reference to the drawings accompanying the provisional specification in which:

FIG. 37 shows the definition of direct and indirect neighbours.

FIGS. 38, 39, 40 and 41 shows basic asymmetric operators.

FIG. 42 shows a pattern resistant to the foregoing operators.

FIG. 43 shows the cleaning operator.

FIG. 44 shows the notation of operator sub-matrix points.

FIG. 45 shows three characters before and after thinning.

In what follows new terms are introduced and definitions of old terms changed for convenience in explaining the details of the embodiments. The term 'basic operator' is introduced to denote one phase of a group of the cases as defined hereinbefore, the group being such that the cases are related by a binary logic function other than the simple 'AND' function which suffices for each case separately. For example, an operator which will be named later as Operator 16, consists of the three cases 3, 4 and 11 compounded by such a binary logic function. Referring to FIG. 5, these three cases are related in that there are black points in one side only of each case. In all three cases the centre position in that side is always black and the three cases taken together allow either or both of the end positions of that side to be black. Thus the non-exclusive 'OR' function relates the two end positions, the centre position always being black and all other positions white. It will be noted that the cases in Operator 16 are taken from form (a) and (b) operators as defined hereinbefore and that the forms of operators described before do not correspond necessarily with the operator groupings used hereinafter.

These basic operators are described as asymmetric hereinafter, but this is to be taken as referring to the fact that an axis can be found which passes through the operative centre and about which the distribution of black and white points is asymmetric. The term 'asymmetric' does not hereinafter refer to the use of only some phases of a case.

Any basis asymmetric operator, as now defined, which is used in the embodiments to be described is always used in all four phases and is referred to more shortly as a specialised operator. There are a total of four such specialised operators to be described and a selection from them is referred to as a version of a compound operator, the term 'compound operator' retaining its former definition since clearly it can only consist of a selection of the cases of FIG. 5.

Figure 1:
Figure 2:
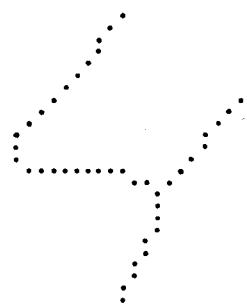
Figure 11:
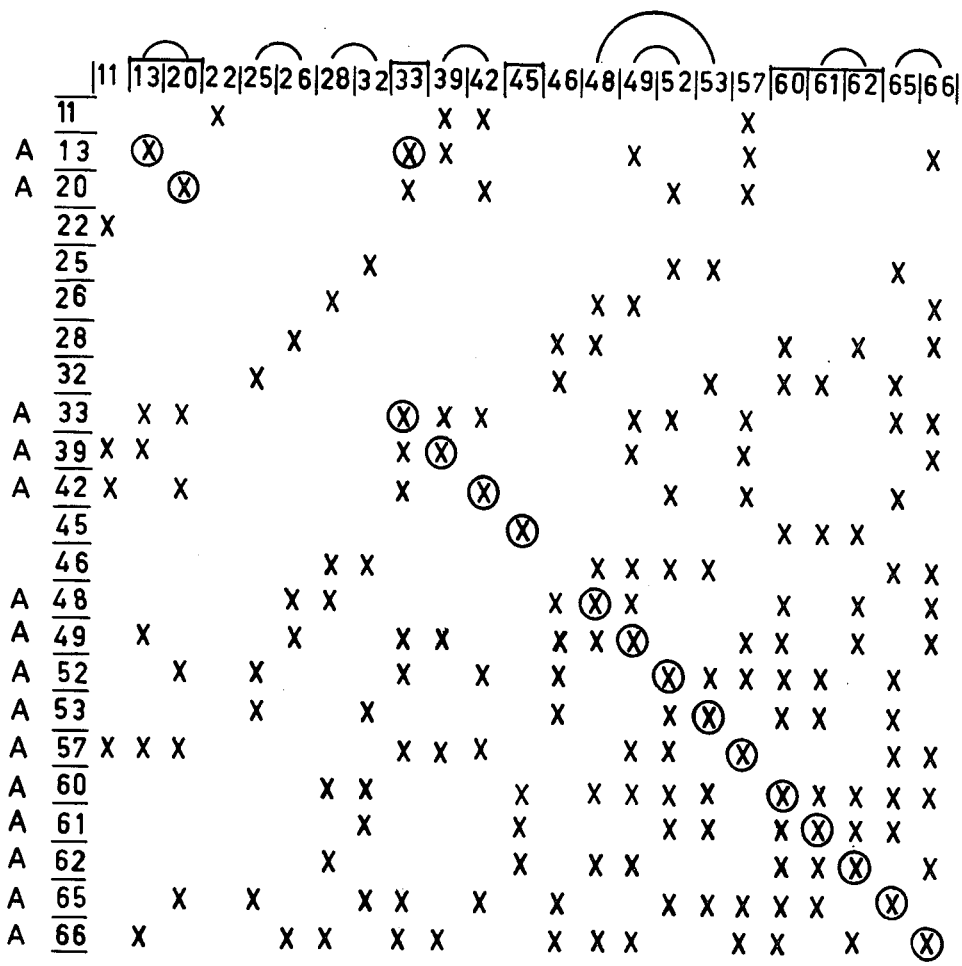
Figure 13:
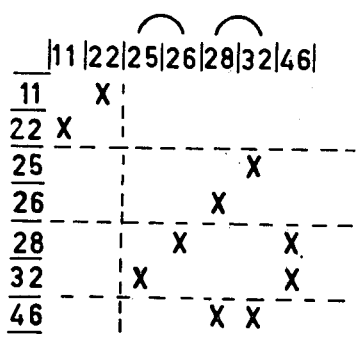
Figure 35:
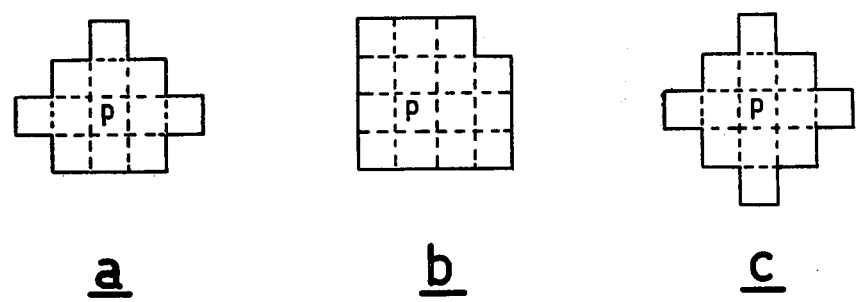
Figure 36:
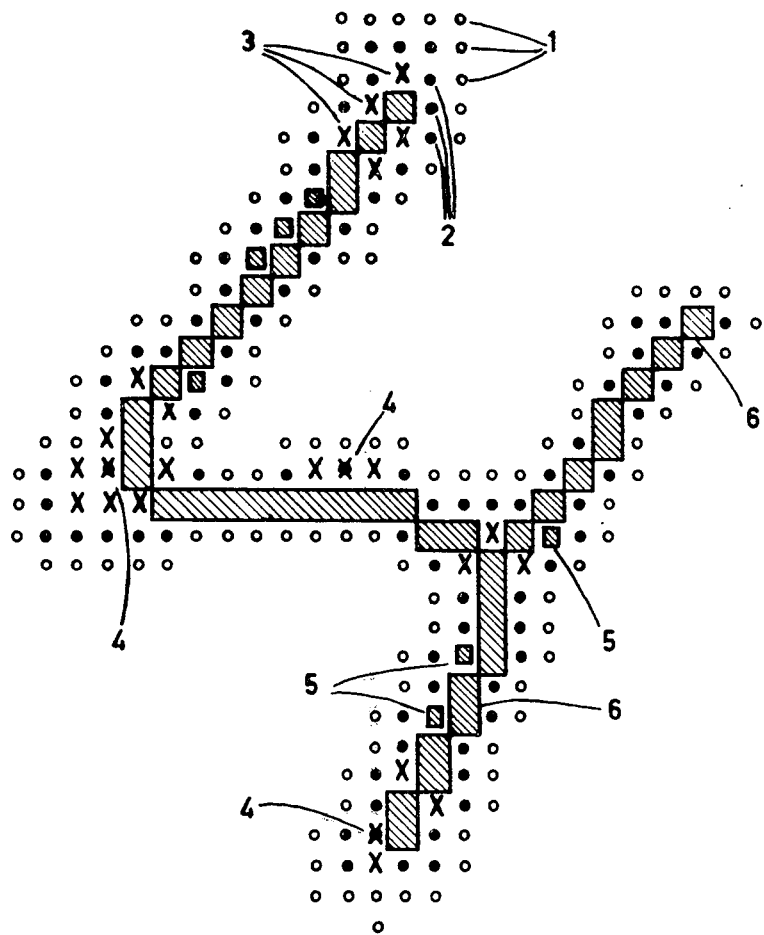
FIG. 36 shows a typical binarised character before and after thinning.

Referring to FIG. 36, only those points are shown which are black or '1' in the original binarised character, the white or 0 points being omitted for clarity. The black points are shown in different ways to indicate whether they are subsequently removed by an operator application and if so by which application. FIG. 36 shows the stages in thinning a character when a first version of the operator is applied twice, followed by two applications of a second version of an operator and finally followed by a single application of a cleaning operator. The clear circles, 1, represent character 1's removed in the first application of the first version of the operator, the black circles 2, those removed in the second application. The plain crosses, 3, represent character 1's removed in the first application of the second version of the operator, the centred crossed, 4, those removed in the second application. The small squares, 5 represent those character 1's removed by the cleaning operator while the large squares represent the character as finally thinned.

In FIGS. 37 to 43 inclusive, the operative centre is shown as P. In FIG. 37 the definition of direct and indirect neighbours is illustrated. Points A are defined as direct or orthogonal neighbours of P and points B as indirect or diagonal neighbours of P. In FIG. 38, the first basic asymmetric operator is shown which is referred to hereinafter as Operator 1a. Operator 1a deals with the situation which occurs when a black point in the binarised character has 3 or 4 white direct neighbours and when it is not desired to preserve the end point of a limb of the character. Using the notation of FIG. 44, Operator 1a writes a white point into a second matrix at the corresponding position if points $N_1, N_2, N_3, N_4$ and $N_5$ of the character are all white and either $N_6$ or $N_8$ is white or $N_7$ is black. Using the superscript bar notation to indicate a 'not 1' or white condition, the logic statement of Operator 1a appears as:

Omit P if $\overline{N1}$ and $\overline{N2}$ and $\overline{N3}$ and $\overline{N4}$ and $\overline{N5}$ and ($\overline{N6}$ or N7 or $\overline{N8}$) - (1)

To produce a specialised operator, Operator 1a would be applied in all the four orientations in which it fits the matrix. In consequence, three other logic conditions accompany that of statement (1)

Omit P if $\overline{N3}$ and $\overline{N4}$ and $\overline{N5}$ and $\overline{N6}$ and $\overline{N7}$ and ($\overline{N8}$ or N1 or $\overline{N2}$) - (2)
Omit P if $\overline{N5}$ and $\overline{N6}$ and $\overline{N7}$ and $\overline{N8}$ and $\overline{N1}$ and ($\overline{N2}$ or N3 or $\overline{N4}$) - (3)
Omit P if $\overline{N7}$ and $\overline{N8}$ and $\overline{N1}$ and $\overline{N2}$ and $\overline{N3}$ and ($\overline{N4}$ or N5 or $\overline{N6}$) - (4)

It will be noticed that the bracketed, three term 'OR' function of each of statements 1 to 4 inclusive can be satisfied in seven different ways only the combination (1, 0, 1) failing to satisfy it. Thus each of statements 1 to 4 could be said to represent seven elementary operators, each having only 'AND' logic statements. This three-term 'OR' function is shown in FIG. 38 by the enclosure 7. These seven elementary operators are one phase of cases 2, 3, 4 and 11, case 0 the isolated black point and two phases of case 1.

FIG. 39 shows the second basic asymmetric operator, hereinafter called Operator 1b. Operator 1b deals with the situation which occurs when a black point in the binarised character has 3 or 4 white direct neightbours and when it is desired to preserve the end point of a limb of the character. Operator 1b writes a white point into a second matrix at the corresponding position if points N1, N2, N3, N4 and N5 of the character are all white, and if point N7 is black and if either N6 or N8 is black. The logic statements of Operator 1b thus appear as:

Omit P if $\overline{N1}$ and $\overline{N2}$ and $\overline{N3}$ and $\overline{N4}$ and $\overline{N5}$ and N7 and (N6 or N8) - (5)
Omit P if $\overline{N3}$ and $\overline{N4}$ and $\overline{N5}$ and $\overline{N6}$ and $\overline{N7}$ and N1 and (N8 or N2) - (6)
Omit P if $\overline{N5}$ and $\overline{N6}$ and $\overline{N7}$ and $\overline{N8}$ and $\overline{N1}$ and N3 and ($N_2$ or $N_4$) - (7)
Omit P if $\overline{N7}$ and $\overline{N8}$ and $\overline{N1}$ and $\overline{N2}$ and $\overline{N3}$ and N5 and (N4 or N6) - (8)

The bracketed two term 'OR' function in each of statements 5 to 8 inclusive can be satisfied in three different ways — only the combination (0, 0) failing to satisfy it. Thus, each of statements 5 to 8 could be said to represent three elementary operators, each having only 'AND' logic statements. This two-term 'OR' function is shown in FIG. 39 by the enclosure 8. These three elementary operators are one phase of cases 3, 4 and 11.

FIG. 40 shows the third basic asymmetric operator, hereinafter called Operator 2. Operator 2 deals with the situation which occurs when P has two white direct neighbours by omitting P if N1, N2 and N3 are black and N5, N6 and N7 are white, the condition of N4 and N8 being irrelevant. The logic statements of Operator 2 thus appear as:

Omit P if $\overline{N1}$ and $\overline{N2}$ and $\overline{N3}$ and N5 and N6 and N7 - (9)
Omit P if $\overline{N3}$ and $\overline{N4}$ and $\overline{N5}$ and N7 and N8 and N1 - (10)
Omit P if $\overline{N5}$ and $\overline{N6}$ and $\overline{N7}$ and N1 and N2 and N3 - (11)
Omit P if $\overline{N7}$ and $\overline{N8}$ and $\overline{N1}$ and N3 and N4 and N5 - (12)

Since in (9) N4 and N8 can both be either black or white, (9) corresponds to the cases 12, 25, 26 and 46.

FIG. 41 shows the fourth basic asymmetric operator, hereinafter called Operator 3. Operator 3 deals with the situation which occurs when P has only one white direct neighbour by omitting P if N1 is white and N3, N4, N5, N6, N7 and N18 are black. In this operator, the asymmetry lies not only in the distribution of 1's and 0's about P within the 3 × 3 sub-matrix surrounding P but in including a single point, N18, more remote from P. The logic statements of Operator 3 appear as:

Omit P if $\overline{N1}$ and N3 and N4 and N5 and N6 and N7 and N18 - (13)
Omit P if $\overline{N3}$ and N5 and N6 and N7 and N8 and N1 and N22 - (14)
Omit P if $\overline{N5}$ and N7 and N8 and N1 and N2 and N3 and N10 - (15)
Omit P if $\overline{N7}$ and N1 and N2 and N3 and N4 and N5 and N14 - (16)

Since in (13) N2 and N8 can both be either black or white, (13) corresponds to cases 45E, 60E, 61E and 62E.

A compound operator consists of a combination of Operators 1a, 1b, 2 and 3. It has been found, however, that thinning processes based on such compound operators may not thin the character to a skeleton of one point thickness. A character limb as shown in FIG. 42 will not be thinned any further. To achieve single point thickness a 'cleaning' operator is used. This cleaning operator removes all redundant points serially and is shown in FIG. 43. The logic statements of this operator appear as:

Omit P if ($\overline{N3}$ or $\overline{N5}$) and $\overline{N4}$ and N7 and N1 - (17)
Omit P if ($\overline{N5}$ or $\overline{N7}$) and $\overline{N6}$ and N1 and N3 - (18)
Omit P if ($\overline{N7}$ or $\overline{N1}$) and $\overline{N8}$ and N3 and N5 - (19)
Omit P if ($\overline{N1}$ or $\overline{N3}$) and $\overline{N2}$ and N5 and N7 - (20)

The combination of Operators 1a, 2 and 3 is a version of the compound operator here called Operator A (remove ends) and the combination 1b + 2 + 3 is a version of the compound operator here called Operator B (preserve ends). For handwritten characters in relatively high definition matrices having 50 points horizontally and 60 points vertically, for example, the thinning process consists of three applications of Operator A followed by two applications of Operator B and finally followed by one application of the cleaning Operator. When lower definition matrices are used having 25 points horizontally and 30 points vertically, for example the thinning process consists of one application of Operator A followed by two applications of Operator B and finally followed by one application of the cleaning operator.

FIG. 36 shows the result of applying a thinning process consisting of two applications of Operator A followed by two applications of Operator B and followed finally by one application of the cleaning operator. FIG. 45 shows FIG. 36 again in simplified form with two other characters thinned by the same process.

If a fixed number of applications of the Operators A and B fails to thin the character adequately it may be advisable to reject the character as being initially too thick. This can be done by noting whether Operator 3 is activated during the last operator application and using such activation as an indication that the character was originally too thick.

Figure 46:
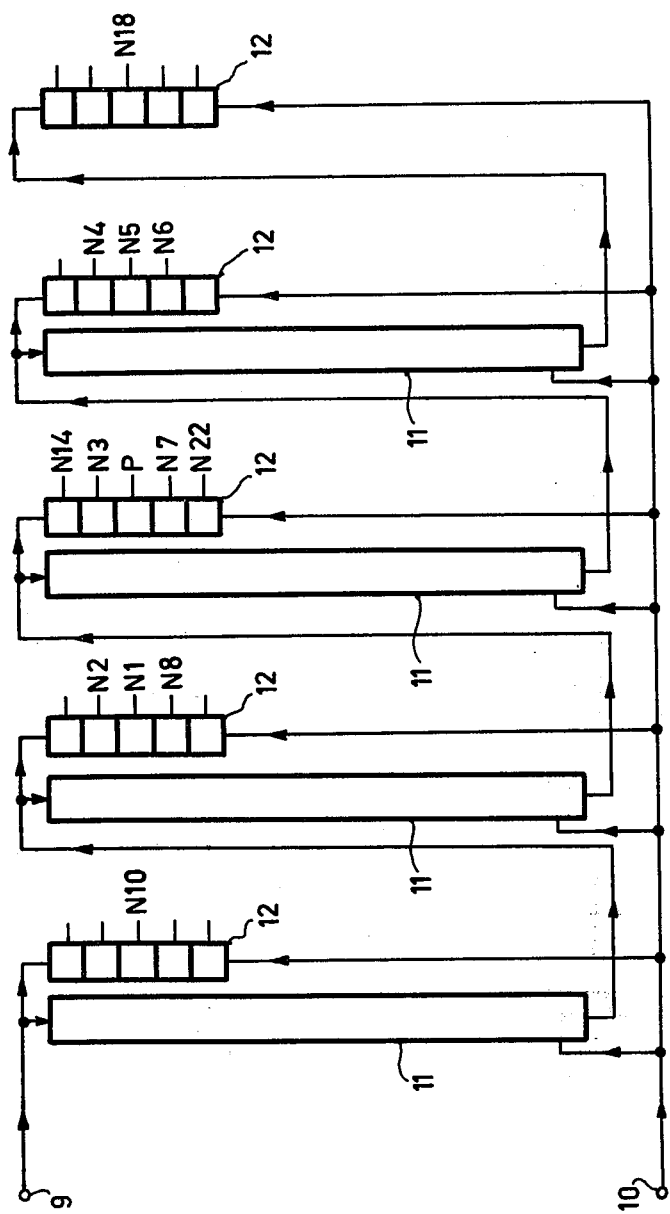
FIG. 46 shows a shift register matrix store.
Figure 47:
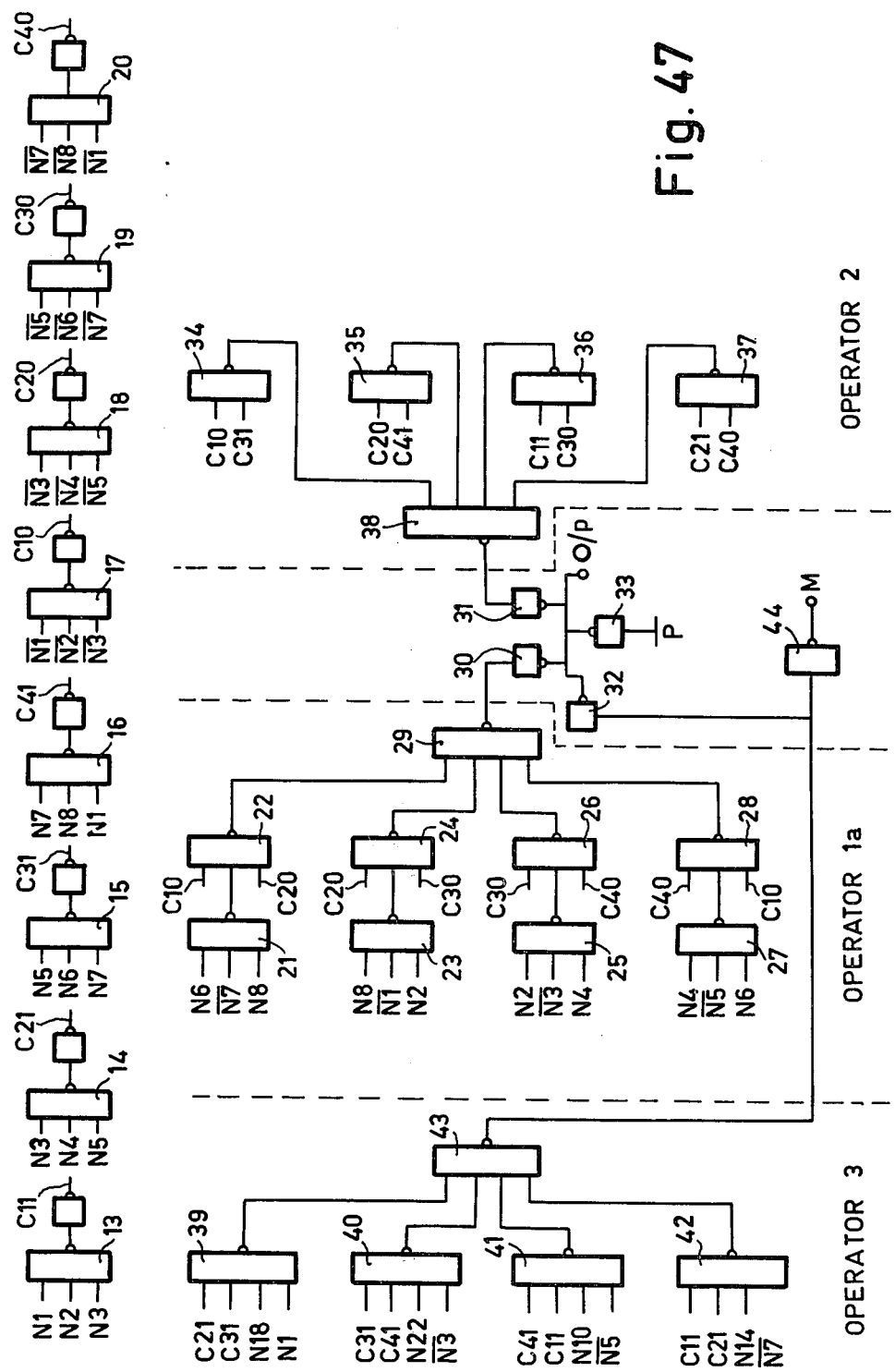
FIG. 47 shows a block diagram of an operator circuit.
Figure 49:
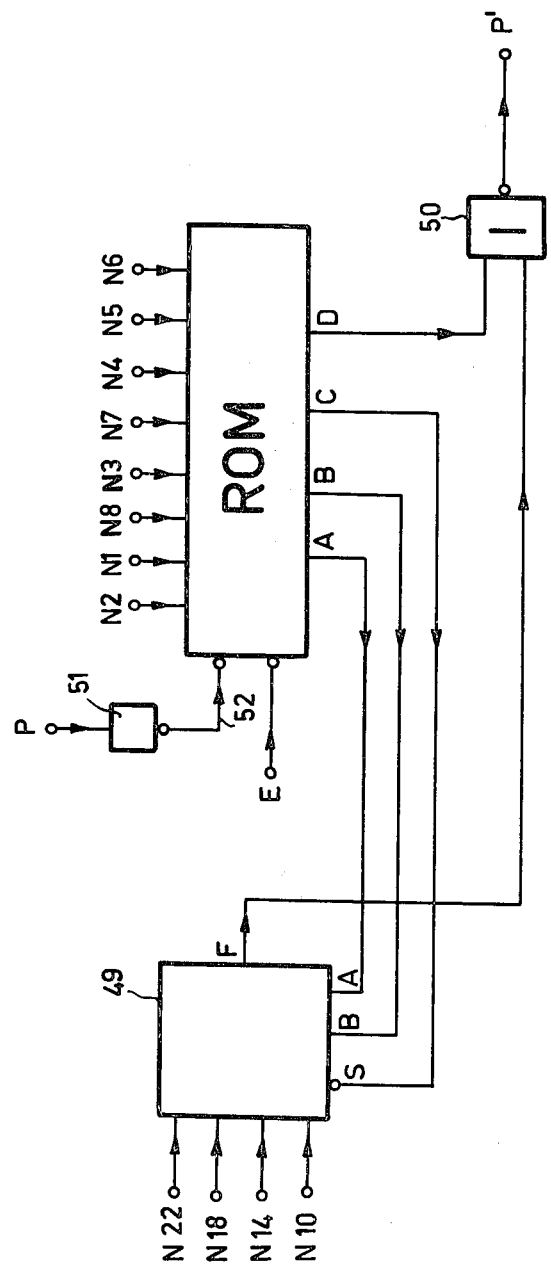
FIG. 49 shows an operator circuit using a Read Only Memory.

FIG. 47 shows a block diagram of a circuit for implementing the Operator A using binary logic elements. FIG. 49 shows another block diagram of such a circuit using a Read Only Memory (ROM) to implement the logic statements of the operators. Both FIG. 47 and FIG. 49 show the binary inputs corresponding to points N1 and N8 inclusive and points N10, N14, N18 and N22 as being available from an external source. Each application of the operator to a point in the binarized character requires a set of connections to be made between the operator inputs and the corresponding character points. All of the connections in the set must be changed when the operator is moved to another point in the binarized character. If the character is held in a computer store of conventional design, standard address circuitry and software may be used to make each set of connections at each step in the operator scanning motion. However, if the character is stored in a shift register as mentioned hereinbefore, the operator connections can be made permanently to certain shift register stages and the scanning motion obtained by the motion of the character points through the shift register. FIG. 46 shows such a shift register matrix store. It is assumed that the original character on paper is being scanned in vertical columns from bottom to top of the character area, each column being divided into 80 character points. The binarised signal, which is either a 1 represented by a high voltage or a 0 represented by a low voltage arrives, point by point, at the terminal 9. A shift pulse is applied to terminal 10 as each signal point arrives. The store consists of four 80 bit shift registers 11 and five 5 bit shift registers 12. Each register 11 thus holds one vertical column of character points exactly. Registers 11 are connected in series to provide simultaneous vertical shifting of adjacent character columns with transfer of the contents of each column to an adjacent register 11 which total action was referred to previously as 'rolling' the character through the shift register store. At each shift pulse, the signals of a row or part row of points in the character enter the top of the registers 11 simultaneously. These signals also enter the 'dead end' five bit shift registers, 12, connected one each to the top of the registers 11. Thus, at any moment, a 5 × 5 sub-matrix of character points is also present in the set of registers 12 as well as in the registers 11. The continuous application of new character points to terminal 9 and shift pulses to terminal 10 moves the character past the sub-matrix, shifting one column sideways at each complete vertical scan. The stage outputs labelled N1 to N8 inclusive and N10, N14, N18 and N22 in the registers 12 therefore provide the input points suitable for use in the circuits of FIG. 47 or FIG. 49.

Referring to FIG. 47, it is assumed that the direct inputs N1 to N8 inclusive are also available in the inverted form, $\overline{N1}$ to $\overline{N8}$ inclusive. Certain economies in hardware can be obtained if these direct and inverted character points are also combined in corner triples as shown in the combining circuits 13 to 20 inclusive. These economies stem from the fact that all of Operator 2 and major parts of Operators 1a, 1b and 3 are composed of 'corners' of points of like kind. For example, Operator 2 has a corner, $\overline{N1}$, $\overline{N2}$ and $\overline{N3}$ composed of 0's and a corner N5, N6 and N7 composed of 1's, Operators 1a and 1b also have corners $\overline{N1}$, $\overline{N2}$ and $\overline{N3}$ and Operator 3 also has a corner N5, N6 and N7. Thus the outputs of combining circuits 13 to 20 inclusive can be used to build up the various specialised operators. Each of circuits 13 to 20 is a triple input inverting AND gate followed by an inverting stage. Thus in circuit 13 output C11 is a high voltage, 1, if N1, N2 and N3 are all high or 1, and in circuit 17 output C10 is a high voltage 1 if $\overline{N1}$, $\overline{N2}$ and $\overline{N3}$ are all high or 1, that is if N1, N2 and N3 are all low or 0. Each of the specialised operator circuits has four indentical parts, each part implementing the logic statement of one of the four orientations of the basic operator. Thus, for Operator 1a, the 'OR' function shown at 7 in FIG. 38 is implemented by circuit 21 which is a triple input inverting AND gate. The three inputs are N6, $\overline{N7}$ and N8 so that the output of circuit 21 is only a low voltage if the 'OR' function is not satisfied. Circuit 22, also a triple input inverting AND gate, combines the outputs of circuit 21 and those of corner circuits C10 and C20. Consequently, the output of circuit 22 is only a low voltage, 0 if N1, N2, N3, N4 and N5 are all 0's and if the OR' function, 7, of FIG. 38 is satisfied. Thus, logic statement (1) of Operator 1a is implemented. Logic statements (2), (3) and (4) are similarly implemented by circuits 23 to 28 inclusive. Circuit 29, a quadruple input inverting AND gate, has a low output only if all of the outputs of circuits 22, 24, 26 and 28 has a high output, that is, if none of the logic statements (1), (2), (3) and (4) is satisfied. In this event, the value to be written into the second matrix is the present value of the point P, at least as far as Operator 1a is concerned. Similar low outputs are obtained from the circuits implementing the logic of Operators 2 and 3 if none of the logic statements of these operators are satisfied. These outputs are combined with the present value of P to give the corresponding point value to be written into the second matrix at the terminal O/P. This terminal is the common output connection of the four inverters 30, 31, 32 and 33. A low input to each of inverters 30, 31 and 32 will give an output at O/P which is determined by the value of P. In this event, if P is black, or a 1, $\overline{P}$ is a 0' and the output of inverter 33 is a high or a 1. Since the outputs of inverters 30, 31 and 32 would each separately be high under the assumed conditions, the output at terminal O/P is a 1 and so a 1 would be written into the second matrix. Had P been white and all other conditions the same, the output of inverter 33 would have been low which over-rides the other inverter outputs and a 0 would have been written into the second matrix. However if any one or more of the operators is satisfied, the corresponding inputs to inverters 30, 31 or 32 are high and the common output line is held low regardless of the value of P. Consequently a 0 is written into the second matrix whether P was originally a 0 or a 1.

The corner outputs can be used directly to realise Operator 2. For example circuit 34 is a double input inverting AND gate fed from C10 and C31. Thus the output of circuit 34 is low if the logic of statement (9) is satisfied. Likewise, circuits 35, 36 and 37 implement the logic of statements (10), (11) and (12) respectively. If none of these statements is satisfied, the output of quadruple input inverting AND gate 38 is low and so inverter 31 would separately be high thus leaving the value of O/P to be dictated by the other operators or by P as previously described.

Operator 3 is realised by combining the outputs of some of the corners with the relevant additional points. For example, circuit 39 is a quadruple input inverting AND gate fed from C21, C31, N18 and $\overline{N1}$. Thus, the output of 39 is a low voltage if the logic of statement (13) is satisfied. Likewise, circuits 40, 41 and 42 implement the logic of statements (14), (15) and (16) respectively. If none of these statements is satisfied, the output of quadruple input inverting AND gate 43 is low and so inverter 32 would separately be high thus leaving the value of O/P to be dictated by the other operators or by P as previously described.

Operator 3 deals with the situation which occurs when P has only one white direct neighbour, that is, when the side of a character limb is being examined. If at any time during a complete scan of the character by Operator 3 this operator is activated, this can be taken as an indication that some thinning was necessary. If it is activated on the last application to the character, this can be taken as an indication that the character was originally too thick to be properly processed. Inverter 44 is fed from the output of Operator 3 and sets a mark bit M as a warning that the character is defective in this respect.

Figure 48:
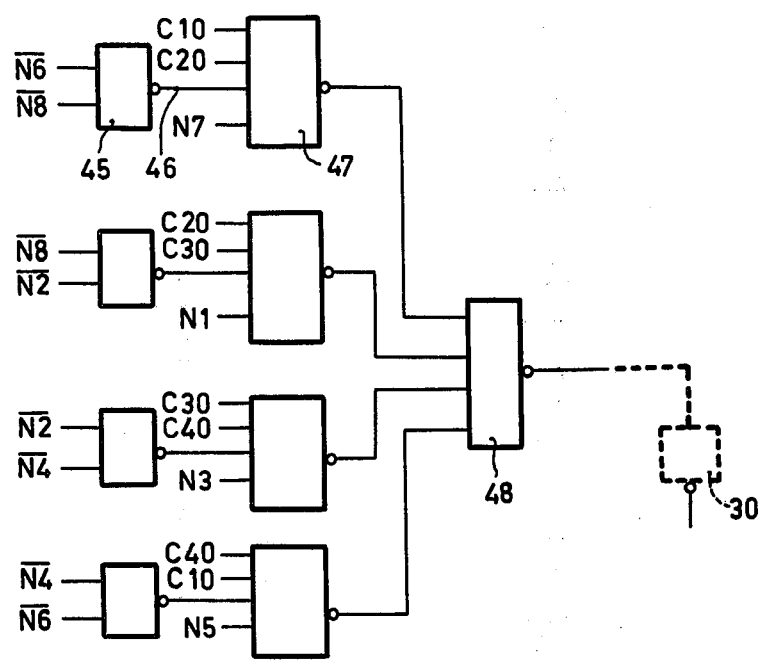
FIG. 48 shows a block diagram of Operator 1b.

FIG. 47 shows the combination of Operators 1a, 2 and 3, that is, Operator A. For Operator B, only Operator 1a has to be changed for Operator 1b. FIG. 48 shows the circuit that can be substituted for that of Operator 1a in FIG. 47. Referring to FIG. 39 the 'OR' function shown at 8 is implemented in FIG. 48 by circuit 45, a double input inverting AND gate. Output 46 is low only if N6 and N8 are low ($\overline{N6}$ and $\overline{N8}$ high), that is when the 'OR' function 8 is not satisfied. Circuit 47 combines the 'OR' function with the remaining points of Operator 1b in the same manner as that described for circuit 22 of Operator 1a. FIG. 48 shows the outputs of the circuits for the other three orientations of Operator 1b combined by circuit 48 to feed inverter 30 at FIG. 47 in substitution for circuit 29.

FIG. 49 shows a different implementation of the logic of FIGS. 47 and 48 using a Read Only Memory (ROM). The ROM used is a commercially available model, Type No. FJB 93406. It has eight binary inputs, here labelled N1 to N8 inclusive, which, on demand, can select any one of $2^8$ or 256 words. Each of these words has four bits whose binary values are available at outputs A, B, C and D. The four bits of each word can be chosen arbitrarily and written permanently into the ROM before the latter is used in its intended application. In the present application a selection of the eight binary inputs N1 to N8 inclusive represents a possible elementary operator in a particular orientation and the associated four bit word can be chosen to represent a set of instructions, possibly coded, indicating whether P should be retained or not if it is black. For example, Operator 1a, shown in FIG. 38 has a three-term 'OR' function. Eight possible combinations of inputs to this 'OR' function exist only one of which does not satisfy the function. Seven of the combinations must be arranged to give rise to an instruction to remove P (if black) and one combination to an instruction to leave P unchanged. Each of these eight combinations appears as a separate four bit word permanently written into the ROM. Operators 1a, 1b, 2 and the cleaning operator are all contained within a 3 × 3 sub-matrix of points having a maximum of 8 operator points outside the operative centre P. Consequently the 8 input ROM is sufficient to store all the instructions for these operators. In principle, only a single bit of the 4 bit word is needed for the instruction and output D is assigned to this function. D takes on the value 1 if P is to be removed unconditionally, which will be the case if any of the Operators 1a, 1b, 2 or the cleaning operator are satisfied. Operator 3, however, has a point outside the 3 × 3 sub-matrix and so four more operator points, N10, N14, N18 and N22 must be taken into account. This is done by arranging for the logic of all the points of Operator 3 which are within the 3 × 3 sub-matrix to be handled by the ROM. If this sub-matrix part of Operator 3 is satisfied D is arranged to output a 0 and C a 0 where previously, for any of the other operators being satisfied, C gave a 1 output. Since reference must now be had to the points N10, N14, N18 and N22, outputs A and B are coded so as to be able to operate means to select one of these four points. The 4-input multiplexer 49, carries out this function, being activated by a strobe signal 0 along line C and outputting one of N10, N14, N18 or N22 along line F to the two input inverting 'OR' gate, 50. The possible outputs on lines A, B, C and D together with the action taken by the circuit are summarized in the following table.

| A | B | C | D | ACTION |
|---|---|---|---|--------|
| X | X | 1 | 0 | Do not remove P |
| X | X | 1 | 1 | Remove P unconditionally |
| X | X | 0 | 1 | (State not allowed) |
| 0 | 0 | 0 | 0 | Remove P if N10 is black |
| 0 | 1 | 0 | 0 | Remove P if N14 is black |
| 1 | 0 | 0 | 0 | Remove P if N22 is black |
| 1 | 1 | 0 | 0 | Remove P if N18 is black |

Where A or B is shown having the value X, this means that the action is taken regardless of the value A or B might have. Thus, if Operator 3 is satisfied D is a 0 and F is a 1. OR gate 50 then outputs a 0 for the value $P^1$ to be inserted in the second matrix. If any of the other operators are satisfied, the multiplexer 49 is not strobed by C and so F outputs a 0 to gate 50. D, however, then has the value 1 and so $P^1$ again has the value 0. The ROM is energised or enabled by the combination of two inputs P and E. If P has the value 0, the result of applying the operator is irrelevant and D is held at the value 1. Inverter 51 applies the correct polarity of P to the ROM, a '1' input along line 52 holding output D at 1. In the event that P is a 1, the ROM is still not enabled until a 0 is applied at input E. The timing of this input to E can be chosen to energise or enable the ROM when the values of all its other inputs have settled to their correct value after a shift pulse has been applied to the shift register matrix store to move the operator on to the next character point.

What we claim is:

1. Character rewriting apparatus for use in recognizing binarized characters made up of points on a matrix of regular rows and columns, comprising:

machine means for applying a compound operator in predetermined cycles to each point of the binarized character on a first matrix, said compound operator having an operative center surrounded by a sub-matrix of points defining an operative area fitting said first matrix; and machine means for rewriting, in each one of said predetermined cycles ones of said character points to which said compound operator is applied into corresponding positions on a second matrix in accordance with a predetermined compound test criterion applied by said compound operator, said compound operator comprising a set of operators, each operator of said set being applied to all of the four orientations in which said operator fits said first matrix, each operator being adapted to apply, in each of said four orientations, a predetermined binary logic function, for each one of said operators, to the binary values of the character points found in coincidence with the sub-matrix points, said compound test criterion being defined so that a character point at the operative center is omitted by said machine means on second matrix if any one of the binary logic functions so applied is satisfied, wherein a binary logic function being satisfied is defined as when those points in the operator defined herein as black or as white are all in coincidence with character points or background points respectively;

each operator of said set of operators having sides of three operator points parallel to said rows and columns, said compound operator comprising:

a. all operators of a first kind having at least two but not more than five black points forming a chain of adjacent black points occupying not more than two adjacent sides of the operator, and b. all operators of a second kind having at least five but not more than seven black points forming a chain of adjacent black points occupying three sides of the operator, all remaining points in the operators of both kinds being white, and the operators of the second kind having an additional external adjacent black point when applied in at least two of the adjacent orientations in which said operator sub-matrix fits said matrix points, said additional black point being located on the center of the side remote from the side having a central white point.

2. Apparatus as claimed in claim 1, in which the operators of the second kind have said additional external adjacent black point in all four of said orientations.

3. Apparatus as claimed in claim 2, wherein the compound operator comprises operators having only one black point.

4. Apparatus as claimed in claim 3 wherein a shift register matrix store is used to apply the operators to the character.

* * * * *